US012695518B2

(12) United States Patent
Nagoshi et al.

(10) Patent No.: US 12,695,518 B2
(45) Date of Patent: Jul. 28, 2026

(54) COMMUNICATION SYSTEM, COMMUNICATION APPARATUS, AND COMMUNICATION METHOD

(71) Applicant: NTT, Inc., Tokyo (JP)

(72) Inventors: Haruka Nagoshi, Musashino (JP); Hiroaki Katsurai, Musashino (JP); Tomoaki Yoshida, Musashino (JP)

(73) Assignee: NTT, Inc., Tokyo (JP)

( * ) Notice: Subject to any disclaimer, the term of this patent is extended or adjusted under 35 U.S.C. 154(b) by 265 days.

(21) Appl. No.: 18/569,812

(22) PCT Filed: Jun. 16, 2021

(86) PCT No.: PCT/JP2021/022793
§ 371 (c)(1),
(2) Date: Dec. 13, 2023

(87) PCT Pub. No.: WO2022/264300
PCT Pub. Date: Dec. 22, 2022

(65) Prior Publication Data
US 2024/0275497 A1 Aug. 15, 2024

(51) Int. Cl.
*H04B 10/00* (2013.01)
*H04B 10/80* (2013.01)
*H04J 14/00* (2006.01)

(52) U.S. Cl.
CPC ................................. *H04B 10/808* (2013.01)

(58) Field of Classification Search
CPC ................ H04B 10/272; H04J 14/0227; H04J 14/0267; H04J 14/0272; H04J 14/0273; H04J 14/0275; H04J 14/0282; H04J 14/08
See application file for complete search history.

(56) References Cited

U.S. PATENT DOCUMENTS

2021/0409125 A1* 12/2021 Wey ..................... H04B 10/272

FOREIGN PATENT DOCUMENTS

| JP | 2012151660 | 8/2012 |
| JP | 2012244212 | 12/2012 |
| JP | 2013106066 | 5/2013 |

OTHER PUBLICATIONS

Monobe et al., "Reducing Wake-up Overhead for Energy-Efficient On-Demand Wireless Sensor Networks," Proceedings of the International Workshop on Low-Layer Implementation and Protocol Design for IOT Applications (IoT-LINK), Washington D.C., USA, Dec. 4, 2016, 6 pages.
Ujikawa, "Research on Power Saving of Passive Optical Network (PON) System," Dissertation for the degree of Doctor of Philosophy, Tohoku University Institutional Repository, Mar. 2017, 167 pages (with machine translation).

* cited by examiner

*Primary Examiner* — Daniel G Dobson
(74) *Attorney, Agent, or Firm* — Fish & Richardson P.C.

(57) ABSTRACT

A first communication device, transmits a startup instruction signal and a second communication device restarts supply of power that has been stopped in a sleep state when receiving the startup instruction signal from the first communication device and includes transmission data in a startup completion signal when generating the start completion signal that is a response signal to the startup instruction signal.

6 Claims, 10 Drawing Sheets

COMMUNICATION SYSTEM, COMMUNICATION APPARATUS, AND COMMUNICATION METHOD

CROSS-REFERENCE TO RELATED APPLICATIONS

This application is a National Stage application under 35 U.S.C. § 371 of International Application No. PCT/JP2021/022793, having an International Filing Date of Jun. 16, 2021.

The disclosure of the prior application is considered part of the disclosure of this application, and is incorporated by reference in its entirety into this application.

TECHNICAL FIELD

The present invention relates to a communication system, a communication device, and a communication method.

BACKGROUND ART

In a communication system including an OLT (Optical Line Terminal) which is a communication device for terminating an optical line installed on a station side of a communication carrier and an ONU (Optical Network Unit) which is a communication device for terminating an optical line installed on a subscriber's house side, a sleep function is known in which power supply is stopped to a part of functions provided in an ONU to bring the ONU into a sleep state (see, for example, NPL 1). Such a sleep function is configured to, for example, when an ONU is installed outdoors and is activated by a battery, since power consumption can be reduced, it is particularly effective (see, for example, NPL 2).

When the sleep state of the ONU is released, a series of processing as shown in FIG. 10 is performed, for example. The OLT transmits a startup instruction signal to the ONU in order to release the sleep state (step S1). When the ONU receives a signal transmitted by the OLT, the ONU performs signal reception processing, and when detecting that the signal received in the signal reception processing is a startup instruction signal, the ONU restarts power supply and shifts from a sleep state to an activate state (step S2). The ONU transmits a start completion signal, which is a response signal to the startup instruction signal, to the OLT after shifting to the activate state (step S3). The OLT receives a start completion signal transmitted by the ONU (step S4). The ONU transmits the transmission data to the OLT after transmitting the start completion signal (step S5). The OLT receives transmission data transmitted by the ONU (step S6).

CITATION LIST

Non Patent Literature

[NPL 1] Hirotaka Ujikawa, "Research on Power Saving in PON (Passive Optical Network) Systems", Tohoku University, Doctoral Thesis, Mar. 24, 2017

[NPL 1] Masanori Monobe and Hiroyuki Yomo, "Reducing Wake-up Overhead for Energy-Efficient On-Demand Wireless Sensor Networks", Proc. of International Workshop on Low-Layer Implementation and Protocol Design for IoT Applications (IoT-LINK) in conjunction with Globecom 2016, December 2016

SUMMARY OF INVENTION

Technical Problem

When a series of processing shown in FIG. 10 is performed, there is a problem that the ONU requires power to transmit the start completion signal during a step S3 and power to transmit the transmission data during a step S5.

In view of the above circumstances, the present invention is an aim of providing a technique for saving power consumed when the sleep state is released in a communication system with a sleep state.

Solution to Problem

An aspect of the present invention is a communication system comprising:

a first communication device that transmits a startup instruction signal;

a second communication device that restarts supply of power that has been stopped in a sleep state when the startup instruction signal is received from the first communication device, and includes a signal processing unit that includes transmission data in the start completion signal when generating the start completion signal that is a response signal to the startup instruction signal.

One aspect of the present invention is a communication device that restarts supply of power that has been stopped in a sleep state when receiving the startup instruction signal, and includes a signal processing unit that includes transmission data in the start completion signal when generating the start completion signal that is a response signal to the startup instruction signal.

An aspect of the present invention is a communication method, wherein: a first communication device transmits a startup instruction signal, a second communication device restarts supply of power that has been stopped in a sleep state when receiving the startup instruction signal from the first communication device, and includes transmission data in the start completion signal when generating the start completion signal that is a response signal to the startup instruction signal.

Advantageous Effects of Invention

According to the present invention, in a communication system having a sleep state, it is possible to save power consumed when releasing the sleep state.

3

Figure 6:
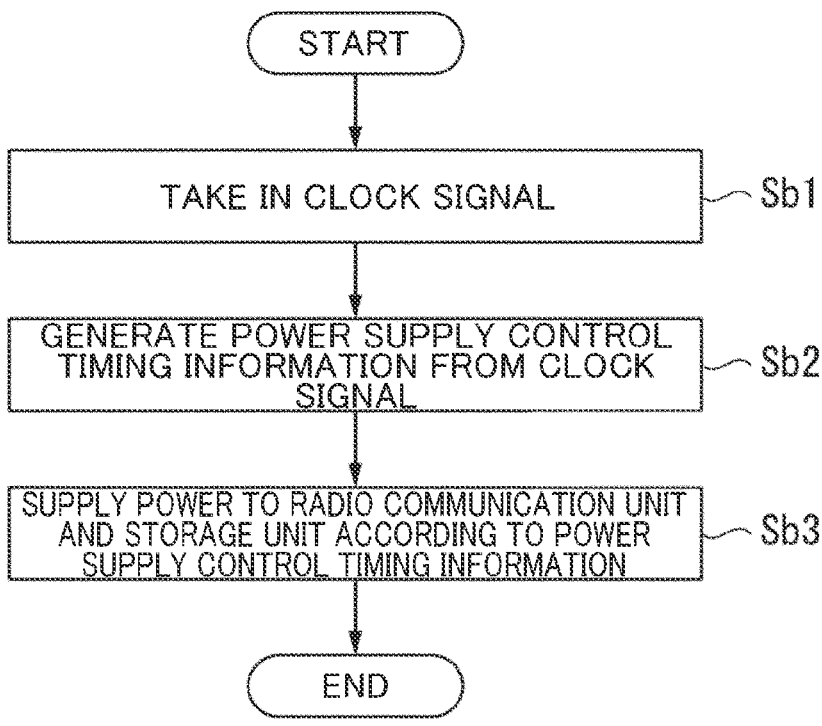

FIG. 6 is a sequence diagram showing an example of the flow of processing performed by a startup instruction unit and a power supply control unit according to the second embodiment.

Figure 7:
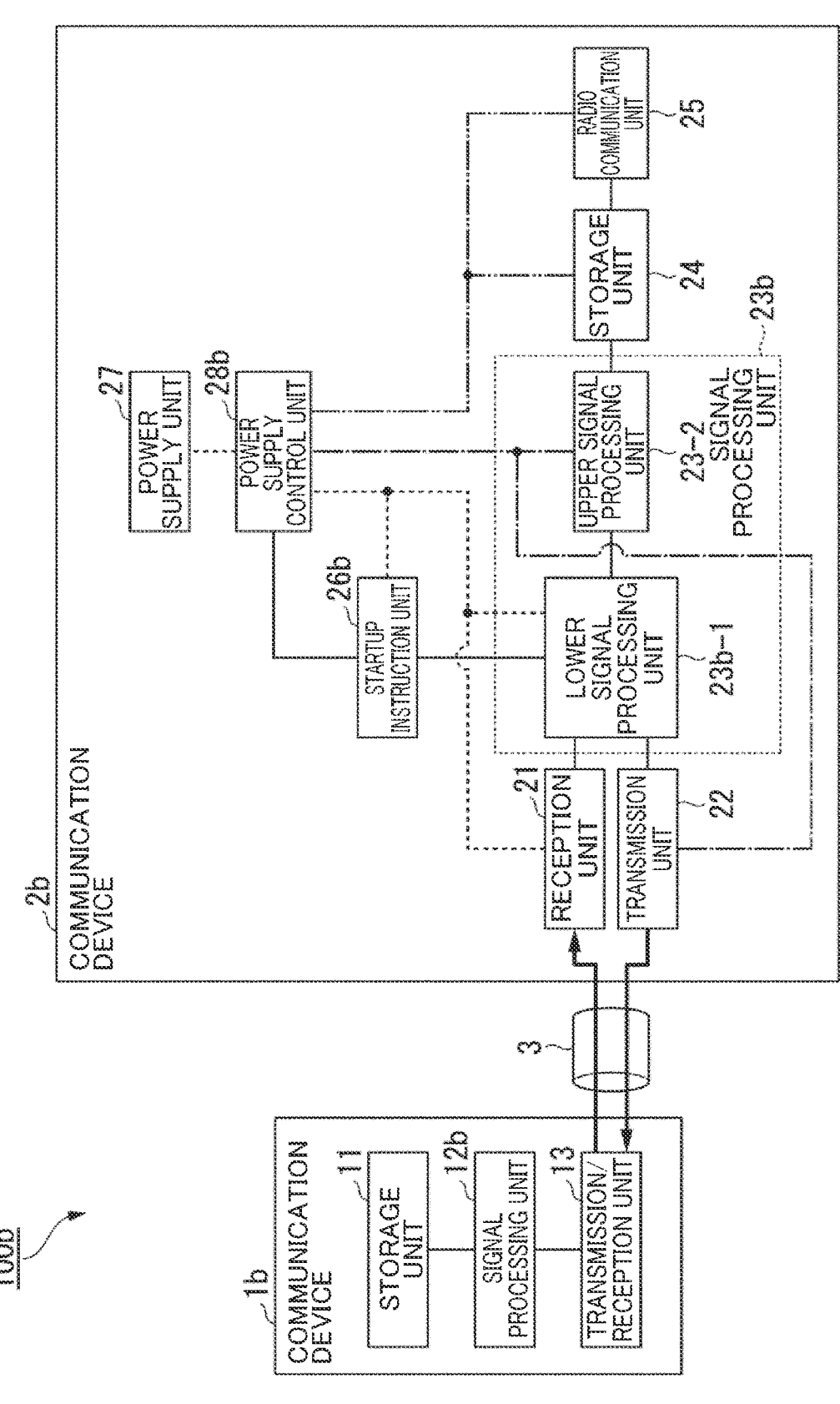

FIG. 7 is a block diagram showing an example of a configuration of a communication system according to a third embodiment.

Figure 8:
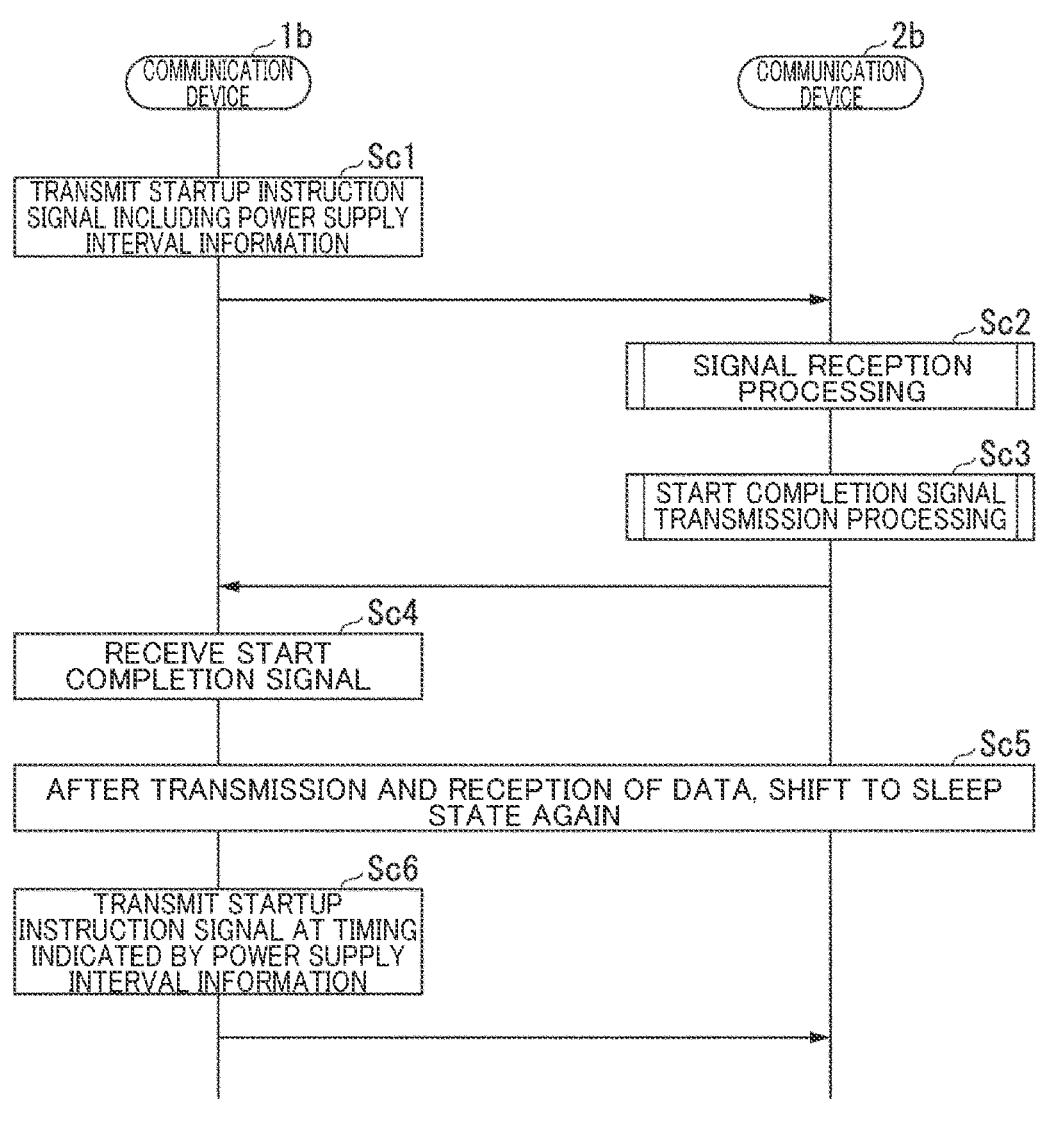

FIG. 8 is a sequence diagram showing a flow of processing performed by a communication system according to the third embodiment.

Figure 9:
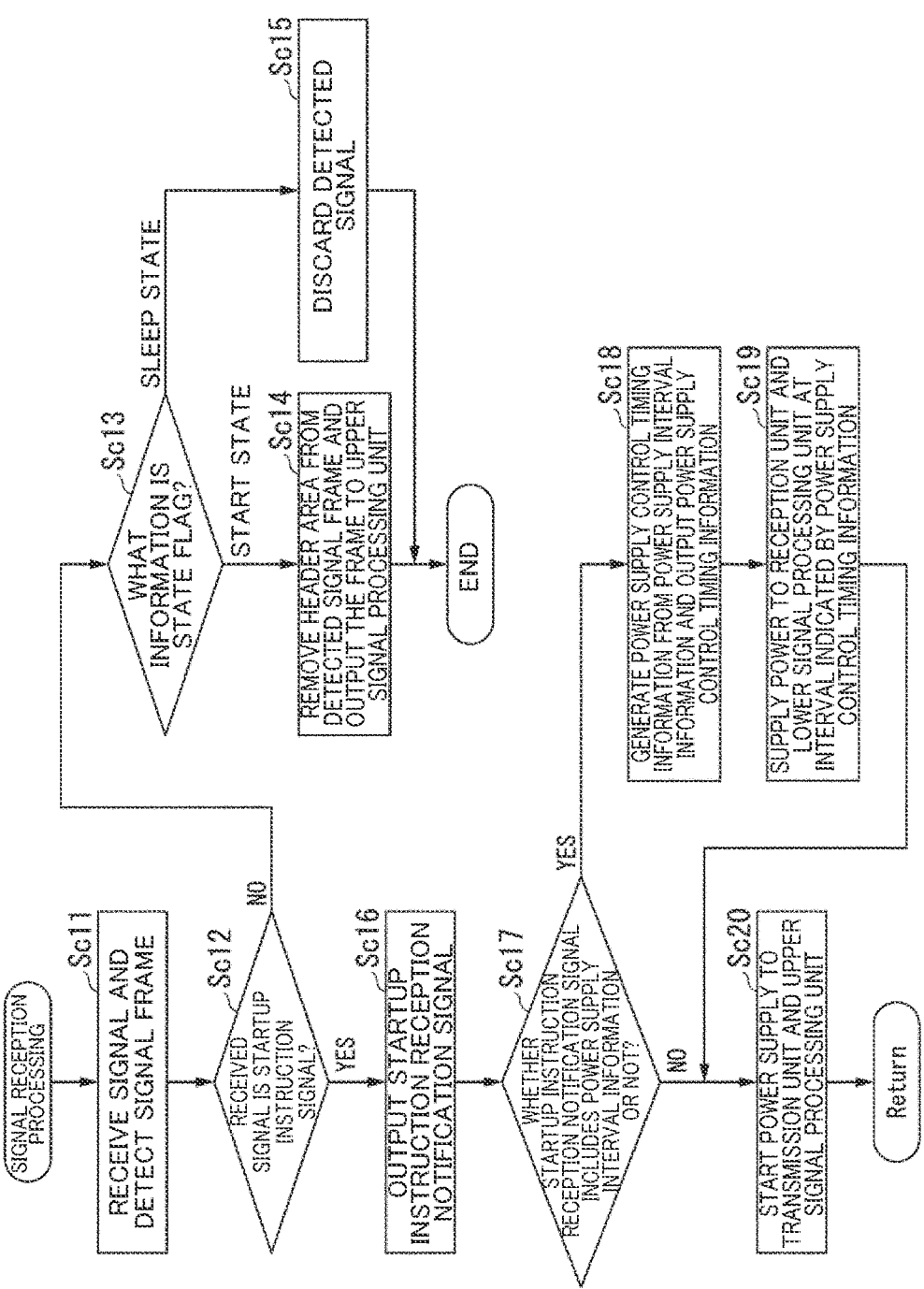

FIG. 9 is a sequence diagram showing a flow of a subroutine of signal reception processing according to the third embodiment.

Figure 10:
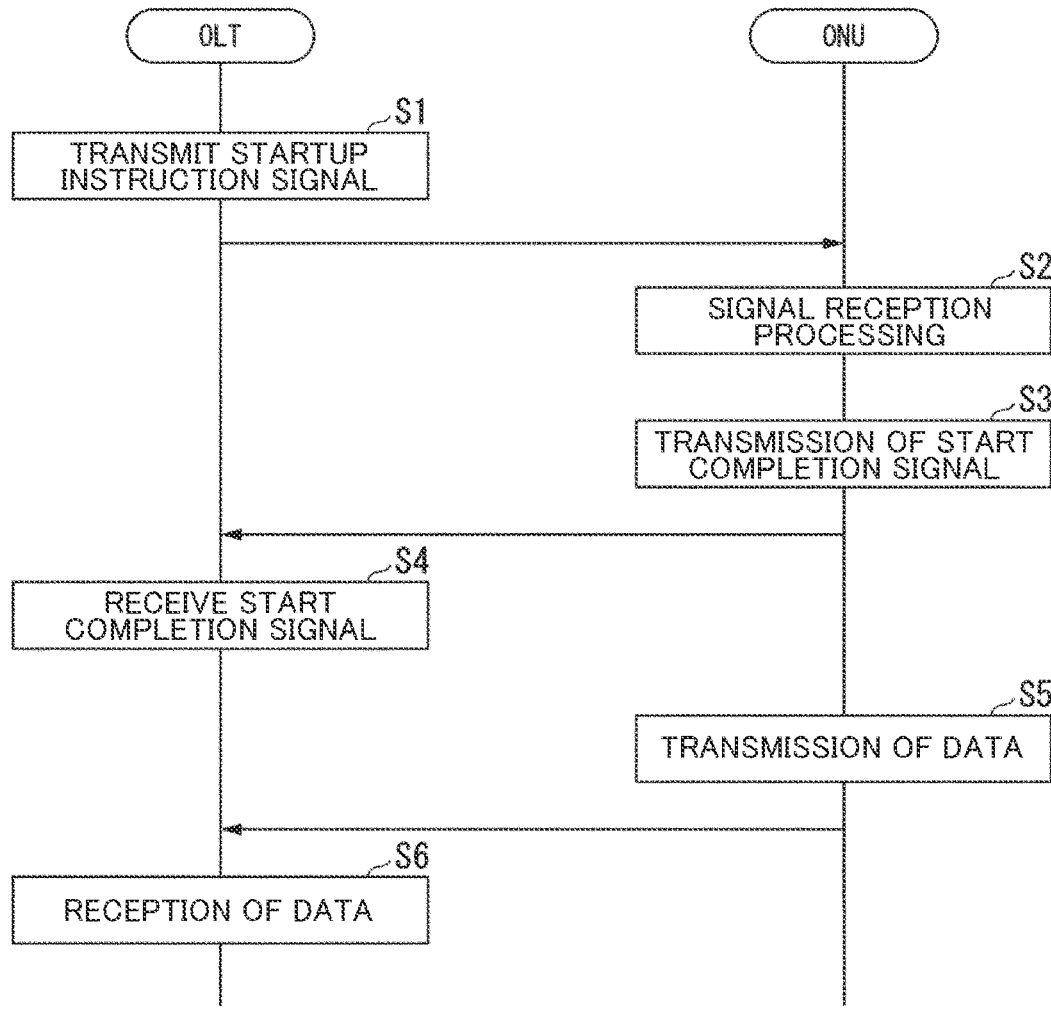

FIG. 10 is a sequence diagram showing a flow of processing performed when releasing the sleep state of an ONU having the sleep state.

DESCRIPTION OF EMBODIMENTS

Embodiment 1

Figure 1:
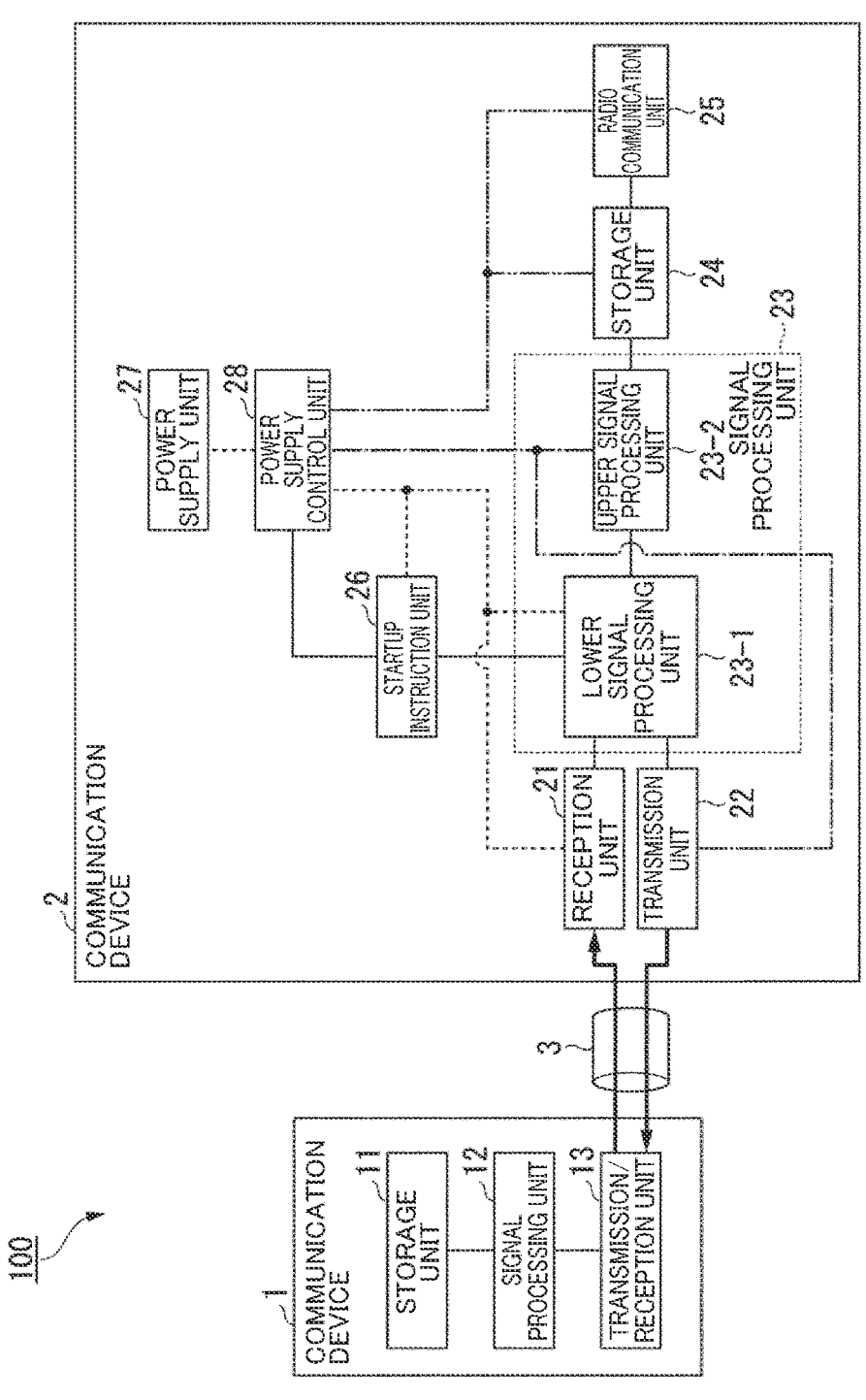
FIG. 1 is a block diagram showing an example of a configuration of a communication system according to a first embodiment.

Hereinafter, embodiments of the invention will be described with referring to the drawings. FIG. 1 is a diagram showing an example of a configuration of a communication system 100 according to the first embodiment. The communication system 100 includes a communication device 1, a communication device 2, and an optical fiber transmission line 3 that connects the communication device 1 and the communication device 2. In FIG. 1, a connection line indicated by a thin solid line is a connection line through which an electric signal propagates. The thick solid line of connection line is a connection line through which an optical signal propagates. The dashed line, the dashed-dotted line, and the dashed-two dotted line are connecting lines indicating a power supply path in the communication device 2. The above-mentioned connection lines are also assumed to be the same as those shown in FIG. 1 unless otherwise defined.

The communication device 1 is, for example, an OLT, and includes a storage unit 11, a signal processing unit 12, and a transmission/reception unit 13. The storage unit 11 stores data to be transmitted to the communication device 2 and data received from the communication device 2. In the following description, the data transmitted by the communication device 1 is also referred to as the data in the downward direction, and the data received by the communication device 1 is also referred to as the data in the upward direction.

The signal processing unit 12 generates a signal frame for a data transmission signal including the data in the downward direction stored in the storage unit 11 when transmitting the data in the downward direction stored in the storage unit 11. The signal processing unit 12 generates a signal frame for a startup instruction signal when releasing the sleep state of the communication device 2. The signal processing unit 12 outputs the generated signal frame to a transmission/reception unit 13 as an electric transmission signal. Note that, it is assumed that the types of transmission signals, such as the data transmission signal and the startup instruction signal, can be discriminated by information written at a predetermined position in the header area of the signal frame and at a position where information indicating the type of the signal is written (hereinafter simply referred to as "the position indicating the type of the signal in the header area").

The electrical signal processing unit 12 detects a signal frame from the electrical signal output by the transmission/reception unit 13. The signal processing unit 12 refers to information written in a position indicating the type of the signal in the header area of the detected signal frame to determine the type of the received signal. The signal processing unit 12 performs processing corresponding to the determined type of signal to the detected signal frame. For example, when the type of the signal is either a data transmission signal or a start completion signal, the signal processing unit 12 reads out data included in the signal frame as reception data. The signal processing unit 12 writes the read reception data in the storage unit 11 as data in an upward direction and stores the data.

The transmission/reception unit 13 is, for example, an optical transceiver, and converts the electric transmission signal generated by the signal processing unit 12 into an optical transmission signal. The transmission/reception unit 13 outputs the converted optical signal to the optical fiber transmission line 3. The transmission/reception unit 13 receives the optical signal transmitted by the optical fiber transmission line 3. The transmission/reception unit 13 converts the received optical signal into an electrical signal and outputs the converted signal to the electrical signal processing unit 12.

The communication device 2 is, for example, an ONU, and includes a reception unit 21, a transmission unit 22, a signal processing unit 23, a storage unit 24, a radio communication unit 25, a startup instruction unit 26, a power supply unit 27, and a power supply control unit 28.

The reception unit 21 is, for example, an optical transceiver for reception, and receives an optical signal transmitted by the optical fiber transmission line 3 as a reception signal. The reception unit 21 converts the received optical signal into an electrical signal and outputs the converted signal to the signal processing unit 23. The transmission unit 22 is, for example, an optical transceiver for transmission, and converts an electric transmission signal generated by the signal processing unit 23 into an optical transmission signal and transmits the converted signal to the optical fiber transmission line 3. Note that, the reception unit 21 and the transmission unit 22 may be integrally formed as the transmission/reception unit 13 of the communication device 1. However, it is assumed that the reception unit 21 and the transmission unit 22 are separated from each other in power supply, and can be individually started and stopped.

The signal processing unit 23 includes a lower signal processing unit 23-1 and an upper signal processing unit 23-2. The processing performed by the signal processing unit 23 is applied to, for example, an OSI (Open Systems Interconnection) reference model, a TCP (Transmission Control Protocol)/IP (Internet Protocol) protocol stack, and the like, and is divided into two types: the processing performed by a lower layer up to a layer for discriminating the type of the startup instruction signal and the processing performed by an upper layer exceeding the lower layer are separated. In this case, the lower signal processing unit 23-1 performs processing corresponding to processing performed in the separated lower layer, and the upper signal processing unit 23-2 performs processing corresponding to processing performed in the upper layer. Here, the processing performed in the lower layer is, for example, a processing performed in a data link layer or a MAC (Media Access Control) layer. The lower signal processing unit 23-1 and the upper signal processing unit 23-2 are separated from each other in power supply, and can be individually started and stopped.

The upper signal processing unit 23-2 has the following configuration in addition to the configuration of processing performed in the upper layer. The upper signal processing unit 23-2, when power is supplied and started up, generates a signal frame corresponding to its own layer containing the data in the upward direction stored in the storage unit 24 when the storage unit 24 stores data in the upward direction. The upper signal processing unit 23-2 outputs the generated signal frame and a start completion notification signal to the lower signal processing unit 23-1. The upper signal processing unit 23-2, when power is supplied and started up, generates a signal frame corresponding to its own layer not containing data when the storage unit 24 does not store data in the upward direction. The upper signal processing unit 23-2 outputs the generated signal frame and a start completion notification signal to the lower signal processing unit 23-1. When the layer corresponding to the upper signal processing unit 23-2 is a plurality of layers, the generation of the signal frame corresponding to its own layer by the upper signal processing unit 23-2 means the generation of the signal frame to which the header area corresponding to each of the plurality of layers is added.

The lower signal processing unit 23-1 has the following configuration in addition to the configuration of processing performed in the lower layer. When the reception signal received by the reception unit 21 is a startup instruction signal, the lower signal processing unit 23-1 outputs a startup instruction reception notification signal. The lower signal processing unit 23-1 has a state flag area in an internal storage area in advance. In the state flag, information indicating the sleep state is written in the case of the sleep state, and information indicating the activate state is written in the case of the activate state. When receiving the start completion notification signal and the signal frame from the upper signal processing unit 23-2, the lower signal processing unit 23-1 adds a header area in which information on the type of the start completion signal is written to a position indicating the type of the signal to the received signal frame to generate a signal frame for the start completion signal.

Although the signal processing unit 12 of the communication device 1 is not shown as the lower signal processing unit 23-1 and the upper signal processing unit 23-2 provided in the communication device 2 separately, the signal processing unit 12 is a functional section for performing processing performed in both the upper layer and the lower layer. Therefore, when the signal processing unit 12 generates a signal frame, the signal processing unit 12 generates a signal frame to which a header region corresponding to each of the plurality of layers is added. For example, when generating a signal frame for the startup instruction signal, the signal processing unit 12 writes information on the type of the startup instruction signal at a position indicating the type of the signal in the header area, the header area becomes a header area corresponding to a layer to be processed by the lower signal processing unit 23-1 among a plurality of header areas added by the signal processing unit 12.

The radio communication unit 25 performs radio communication by Wi-Fi (registered trademark), for example, transmits and receives data to and from an external radio communication device, in a state that the radio communication unit 25 is started by being supplied with power. The storage unit 24 stores data output from the signal processing unit 23. The data written in the storage unit 24 by the signal processing unit 23 is transmission data transmitted from the radio communication unit 25 to an external radio communication device, and is also referred to as data in the downward direction. The storage unit 24 stores data received by the radio communication unit 25 from an external radio communication device. The data received by the radio communication unit 25 and written in the storage unit 24 is data transmitted to the communication device 1 by the signal processing unit 23 and the transmission unit 22, and is also referred to as data in the upward direction. The storage unit 24 is a non-volatile recording medium, and holds stored data even when power is not supplied. However, in a state where power is not supplied to the storage unit 24, the radio communication unit 25 and the upper signal processing unit 23-2 cannot read data from the storage unit 24 or write data to the storage unit 24.

When receiving the startup instruction reception notification signal from the lower signal processing unit 23-1, the startup instruction unit 26 outputs a power supply restart instruction signal indicating restart of supply of power stopped during a sleep state to a power supply control unit 28.

The power supply unit 27 is, for example, a battery provided inside the communication device 2. The power supply control unit 28 supplies power supplied from the power supply unit 27 to the reception unit 21, the transmission unit 22, the signal processing unit 23, the storage unit 24, the radio communication unit 25, and the startup instruction unit 26.

In the communication device 2, a connection line indicated by a dashed line is a connection line indicating that power is continuously supplied regardless of whether the communication device 2 is in a sleep state or an activate state. The connection line of the dashed-dotted line is a connection line indicating that power supply is stopped in a sleep state. The connection line of the dashed-two dotted line is a connection line indicating that power is supplied at a predetermined constant interval regardless of whether the connection line is in a sleep state or an activate state. The meaning of the connection line of the dashed line, the connection line of the dashed-dotted line and the connection line of the dashed-two dotted line indicating the supply of power is the same as that of the other figures except FIG. 1 unless otherwise defined.

Therefore, as shown in FIG. 1, the power supply control unit 28 always receives power from the power supply unit 27 continuously. The power supply control unit 28 always continuously supplies the reception unit 21, the lower signal processing unit 23-1 and the startup instruction unit 26, the power received from the power supply unit 27. The power supply control unit 28 stops power supply to the transmission unit 22 and the upper signal processing unit 23-2 during a sleep state. When the power supply control unit 28 receives the power supply restart instruction signal from the startup instruction unit 26, the power supply control unit 28 restarts the supply of the power received from the power supply unit 27 to the transmission unit 22 and the upper signal processing unit 23-2. The power supply control unit 28 supplies the power received from the power supply unit 27 to the storage unit 24 and the radio communication unit 25.

(Processing in Communication System of First Embodiment)

Figure 2:
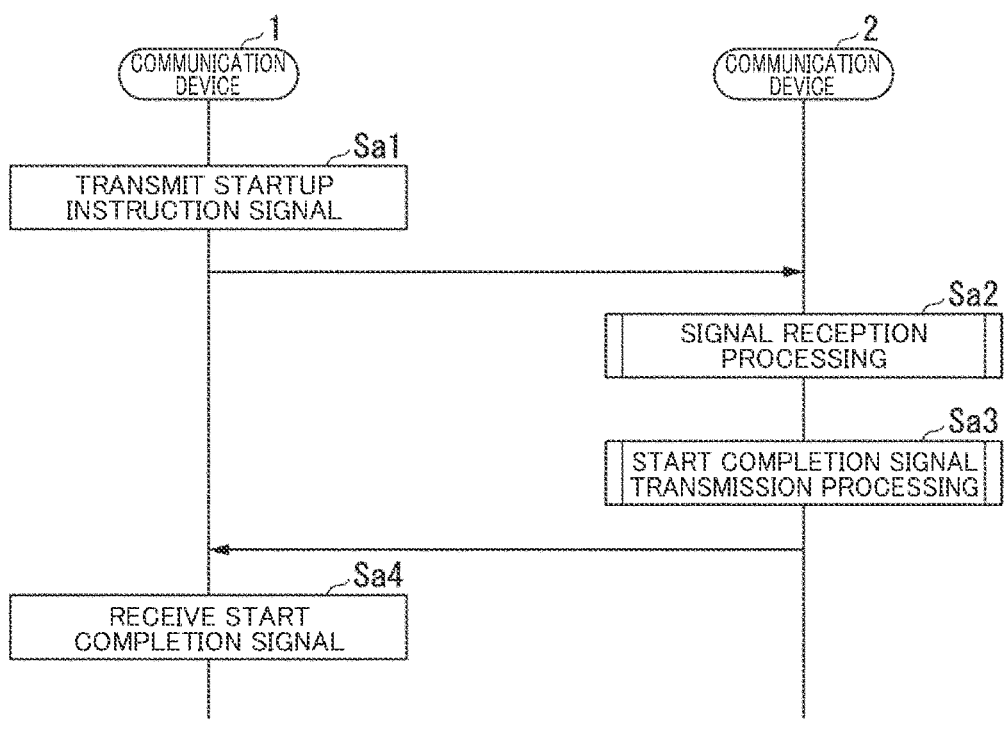
FIG. 2 is a sequence diagram showing a flow of processing performed by the communication system according to the first embodiment.

FIG. 2 is a flow chart showing a flow of processing by the communication system 100 according to the first embodiment. On the assumption of performing the processing shown in FIG. 2, it is assumed that the communication device 2 is in a sleep state, and the transmission unit 22 and the upper signal processing unit 23-2 are in a state in which the power supply is stopped. It is assumed that the state flag of the lower signal processing unit 23-1 is information indicating a sleep state.

The communication device 2 is initially in an activate state in an initial state after startup, and timing at which the communication device 2 is changed from the activate state to the sleep state is, for example, as follows. It is now assumed that the control unit not shown of the communication device 1 detects that there is no data in the upward direction received from the communication device 2 and there is no data in the downward direction transmitted to the communication device 2. The control unit of the communication device 1 causes the signal processing unit 12 to perform processing for causing the communication device 2 to transmit a sleep state start instruction signal for starting the sleep state. When receiving the sleep state start instruction signal from the communication device 1 via the reception unit 21, the lower signal processing unit 23-1 of the communication device 2 rewrites a state flag of an internal storage area from information indicating the activate state to information indicating the sleep state, and outputs a sleep state start instruction reception notification signal to the startup instruction unit 26. The startup instruction unit 26 outputs a power supply stop instruction signal to a power supply control unit 28 when receiving the sleep state start instruction reception notification signal from the lower signal processing unit 23-1. When receiving the power supply stop instruction signal from the startup instruction unit 26, the power supply control unit 28 stops power supply to the transmission unit 22 and the upper signal processing unit 23-2, and the communication device 2 shifts to a sleep state.

Figure 3:
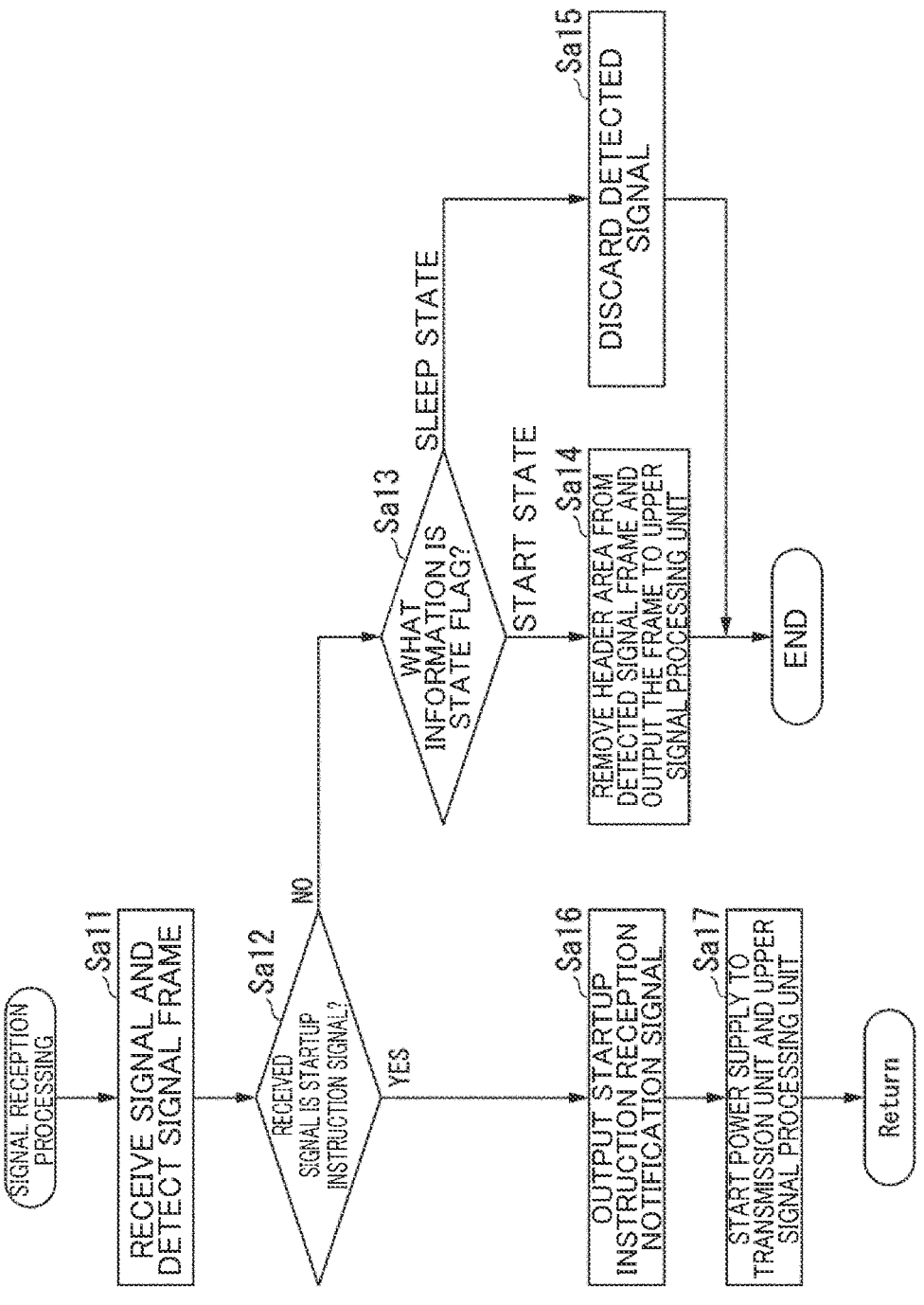
FIG. 3 is a sequence diagram showing a flow of a subroutine of signal reception processing according to the first embodiment.

Processing by the communication device 1 and the communication device 2 will be described below with reference to FIGS. 2 to 4. The signal processing unit 12 of the communication device 1 generates a signal frame for the startup instruction signal at timing of releasing the sleep state of the communication device 2. The signal processing unit 12 generates the startup instruction signal from a signal frame for the startup instruction signal. The signal processing unit 12 outputs the generated startup instruction signal to the transmission/reception unit 13. The transmission/reception unit 13 takes in an electric startup indication signal output by the signal processing unit 12. The transmission/reception unit 13 converts the taken-in electric startup indication signal into an optical startup instruction signal. The transmission/reception unit 13 transmits the optical startup instruction signal to the optical fiber transmission line 3. The optical fiber transmission line 3 transmits the optical startup instruction signal transmitted by the transmission/reception unit 13 to the communication device 2 (step Sa1).

Power is continuously supplied from a power supply unit 27 to the reception unit 21 of the communication device 2 and the lower signal processing unit 23-1 through a power supply control unit 28 even during a sleep state. Therefore, the reception unit 21 can receive the signal of the optical transmitted by the optical fiber transmission line 3. When the reception unit 21 receives the optical signal as a reception signal, the processing of a subroutine of signal reception processing shown in FIG. 2 is started (step Sa2).

The reception unit 21 converts a received optical reception signal into an electric reception signal and outputs it to the lower signal processing unit 23-1. The lower signal processing unit 23-1 takes in the reception signal output by the reception unit 21. The lower signal processing unit 23-1 detects a signal frame from the received signal (step Sa11). The lower signal processing unit 23-1 determines whether or not the received signal is a startup instruction signal on the basis of information written at the position indicating a type of the signal in the header area of the detected signal frame (step Sa12).

When it is determined that the received signal is not a startup instruction signal (step Sa12, No), the lower signal processing unit 23-1 determines whether or not the state flag of the internal storage area is information indicating an activate state, and determines whether or not the information indicating a sleep state is information indicating a sleep state (step Sa13). Here, the state flag is information indicating the sleep state. Therefore, the lower signal processing unit 23-1 determines that the state flag is information indicating a sleep state (step Sa13, sleep state). When the state flag is information indicating a sleep state, power is not supplied to the upper signal processing unit 23-2 and the upper signal processing unit 23-2 cannot perform processing. Therefore, the lower signal processing unit 23-1 discards the detected signal frame (step Sa15) and terminates the processing.

On the other hand, when it is determined that the received signal is the startup instruction signal in the processing of the step Sa12 (step Sa12, Yes), the startup instruction reception notification signal is generated and output to a startup instruction unit 26 (step Sa16). The startup instruction unit 26 generates a power supply restart instruction signal when the startup instruction reception notification signal output by the lower signal processing unit 23-1 is taken in, and outputs the generated power supply restart instruction signal to a power supply control unit 28. The power supply control unit 28 restarts power supply to the transmission unit 22 and the upper signal processing unit 23-2 (step Sa17) when taking in the power supply restart instruction signal output by the startup instruction unit 26, and the processing of a step Sa3 in FIG. 2 is performed.

The transmission unit 22 and the upper signal processing unit 23-2 are started when receiving power supply from a power supply unit 27 via a power supply control unit 28. When the upper signal processing unit 23-2 is started, the processing of a subroutine of start completion signal transmission processing shown in FIG. 4 is started (step SA3).

When started, the upper signal processing unit 23-2 refers to the storage unit 24 at a timing when the storage unit 24 is started by supplying power to the storage unit 24, and determines whether or not the storage unit 24 stores data in the upward direction (step SA21). When it is determined that the storage unit 24 stores the data in the upward direction (step Sa21, Yes), the upper signal processing unit 23-2 reads the data in the upward direction from the storage unit 24 as transmission data. The upper signal processing unit 23-2 generates a signal frame corresponding to its own layer including the read transmission data (step Sa22). The upper signal processing unit 23-2 outputs the generated signal frame and the start completion notification signal to the lower signal processing unit 23-1 (step Sa23).

On the other hand, when it is determined that the storage unit 24 does not store the data in the upward direction (step Sa21, No), the upper signal processing unit 23-2 generates a signal frame corresponding to its own layer not including the data. The upper signal processing unit 23-2 outputs the generated signal frame and the start completion notification signal to the lower signal processing unit 23-1 (step Sa24).

When the lower signal processing unit 23-1 takes in the start completion notification signal outputted by the upper signal processing unit 23-2 and the signal frame, the lower signal processing unit 23-1 rewrites the state flag of the internal storage area to information indicating the activate state (step Sa25). The lower signal processing unit 23-1 adds a header area in which information on the type of the start completion signal is written to a position indicating the type of the signal to the taken-in signal frame to generate a signal frame for the start completion signal. The lower signal processing unit 23-1 generates a start completion signal from the generated signal frame for the start completion signal, and outputs the generated start completion signal to a transmission unit 22 (step Sa26).

The transmission unit 22 converts the start completion signal of electricity output by the lower signal processing unit 23-1 into an optical start completion signal and transmits it to the optical fiber transmission line 3 (step Sa27). Thus, the subroutine of the start completion signal transmission processing shown in FIG. 4 is completed. The optical fiber transmission line 3 transmits the optical start completion signal transmitted by the transmission unit 22 to the communication device 1, and then the processing of a step Sa4 in FIG. 2 is performed.

The transmission/reception unit 13 of the communication device 1 receives the optical signal transmitted by the optical fiber transmission line 3 to make it a reception signal, converts the optical reception signal into an electric reception signal, and outputs it to a signal processing unit 12. The signal processing unit 12 detects a signal frame from the electric reception signal output by the transmission/reception unit 13. The signal processing unit 12 detects that the communication device 2 has shifted from a sleep state to an activate state when it is determined that the reception signal is the start completion signal on the basis of information written at a position indicating a type of a signal in a header area of the detected signal frame. When data is included in the detected signal frame, the signal processing unit 12 reads the data as reception data, and writes the read reception data in the storage unit 11 as data in an upward direction to store the data (step Sa4).

After the processing of the step Sa4, the communication device 1 and the communication device 2 are brought into a state capable of transmitting and receiving normal data. Therefore, when it is detected that the storage unit 11 stores the data in the downward direction to be transmitted to the communication device 2, the signal processing unit 12 of the communication device 1 reads the data in the downward direction from the storage unit 11 as transmission data. The signal processing unit 12 generates a signal frame for a data transmission signal including the read transmission data, and generates an electric data transmission signal from the generated signal frame. Thereafter, the data transmission signal generated by the signal processing unit 12 is transmitted to the communication device 2 via the optical fiber transmission line 3 in the same manner as the processing of transmitting the startup instruction signal in the processing of the step Sa1. When a reception unit 21 of the communication device 2 receives the data transmission signal, the subroutine processing of the reception signal processing of the step Sa2 is performed again.

In the subroutine of the reception signal processing, the processing of the steps Sa11 and Sa12 is performed again. In this case, since the received signal is a data transmission signal, the lower signal processing unit 23-1 determines that the signal is not a startup instruction signal (step Sa12, No). In this case, the state flag of the storage area in the lower signal processing unit 23-1 is information indicating the activate state. Therefore, the lower signal processing unit 23-1 determines that the state flag is information indicating the activate state in the processing of the step Sa13 (step Sa13, activate state). The lower signal processing unit 23-1 removes the header area of the processing object of the lower signal processing unit 23-1 from the detected signal frame, and outputs the signal frame from which the header area is removed to the upper signal processing unit 23-2.

The upper signal processing unit 23-2 takes in a signal frame outputted by the lower signal processing unit 23-1. When data is included in the taken-in signal frame, the upper signal processing unit 23-2 reads the data from the signal frame. The upper signal processing unit 23-2 writes the read data in the storage unit 24 as data in the downward direction and stores the data in the storage unit 24 at a timing when the storage unit 24 is started by supplying power. When the data in the downward direction are written in the storage unit 24, the radio communication unit 25 reads the data in the downward direction from the storage unit 24, transmits the read data in the downward direction to an external radio communication device by radio communication (step Sa14), and the processing is finished.

In the optical transmission system 100 according to the first embodiment, the communication device 1 as a first communication device transmits the startup instruction signal. When receiving the startup instruction signal, the communication device 2 as a second communication device restarts the supply of the power stopped in the sleep state. The signal processing unit 23 included in the communication device 2 includes transmission data in the start completion signal when generating the start completion signal which is a response signal to the startup instruction signal. Thus, since the communication device 2 can transmit the transmission data together when transmitting the start completion signal, reducing the number of times of transmission of the transmission data is transmitted by one time. Therefore, power required for transmission of transmission data to be performed after release of the sleep state can be reduced. Therefore, in the communication system 100 having the sleep state, power consumed when releasing the sleep state can be reduced.

The signal processing unit 12 of the communication device 1 includes a timer therein, starts the timer when an electric startup instruction signal is output to the transmission/reception unit 13, when the electric startup instruction signal is not received from the transmission/reception unit 13 even if the timer expires, outputs the electric startup instruction signal generated in the processing of the step Sa1 again to the transmission/reception unit 13, and starts the timer.

Figure 4:
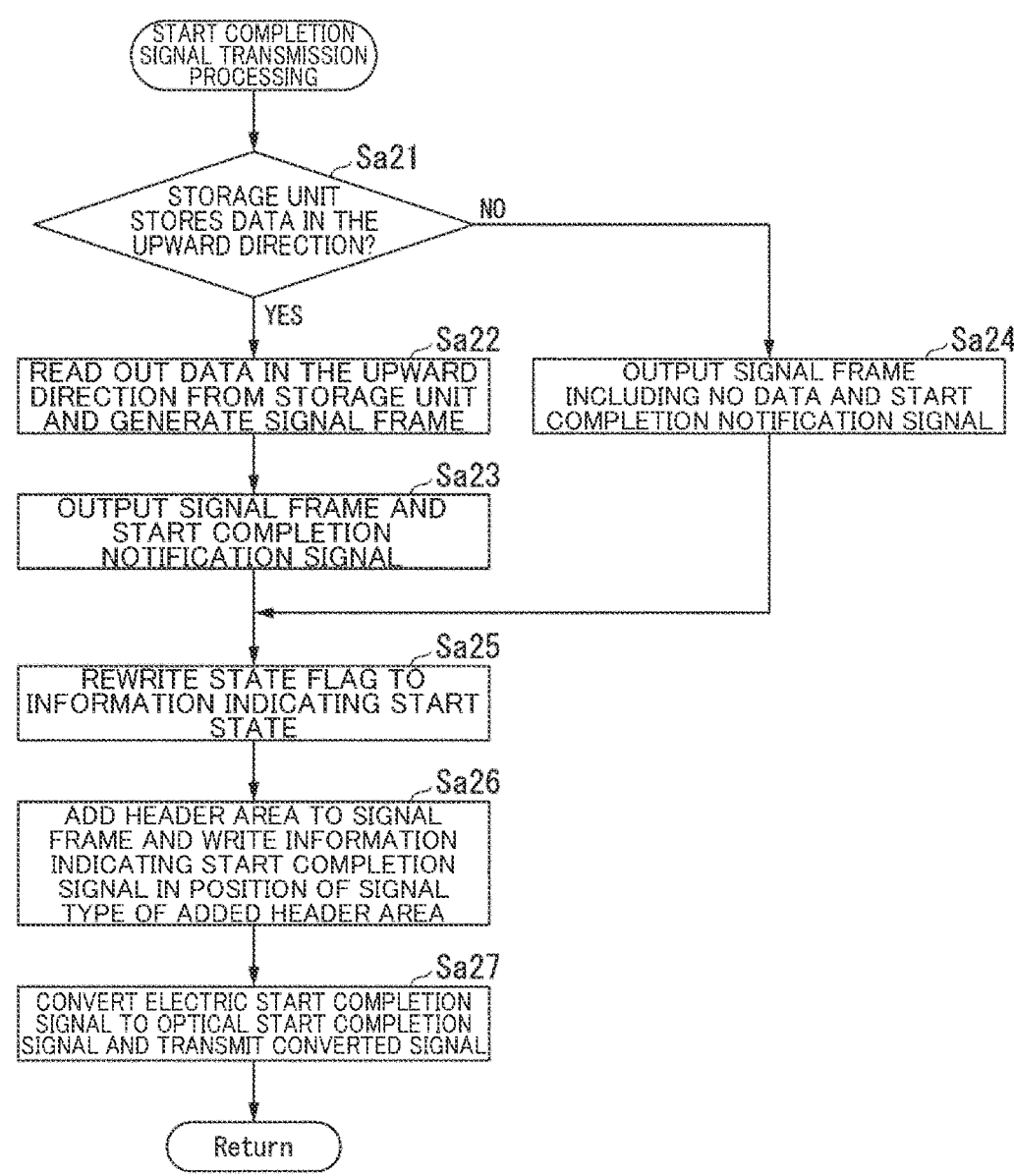
FIG. 4 is a sequence diagram showing the flow of a subroutine of the startup signal transmission processing according to the first embodiment.

In the processing of the step Sa22 of FIG. 4, when the capacity of the data in the upward direction stored in the storage unit 24 is larger than the capacity of the area in which the transmission data is written in the signal frame generated by the upper signal processing unit 23-2, the upper signal processing unit 23-2 reads out data having a capacity smaller than or equal to the capacity which can be written in the area where the transmission data of the signal frame to be generated is written as the transmission data, among the data in the upward direction stored in the storage unit 24. The remaining upward data stored in the storage unit 24 are transmitted from the communication device 2 to the communication device 1 in usual processing for transmitting upward data performed by the communication device 2 after processing of the step Sa3.

In the communication device 2 of the first embodiment above described, the power supply control unit 28 always continuously supplies power to the reception unit 21, the lower signal processing unit 23-1 and the startup instruction unit 26. On the other hand, the power supply control unit 28 may always supply power to the receiving unit 21, the lower signal processing unit 23-1 and the startup instruction unit 26 at a predetermined constant interval between the communication device 1 and the communication device 2. In this case, the signal processing unit 12 of the communication device 1 can specify the timing at which the reception unit 21, the lower signal processing unit 23-1 and the startup instruction unit 26 start, on the basis of a predetermined fixed interval between the communication device 1 and the communication device 2. Therefore, when the signal processing unit 12 transmits the startup instruction signal at the timing, the communication device 2 can receive the startup instruction signal.

The power supply control unit 28 may switch a state in which power is supplied during the sleep state, to the reception unit 21, the lower signal processing unit 23-1, the startup instruction unit 26, the storage unit 24, and wireless communication unit 25, to a state in which power is continuously supplied to the reception unit 21, the lower signal processing unit 23-1, the startup instruction unit 26, the storage unit 24, and the radio communication unit 25 at a predetermined constant intervals, when a power supply restart instruction signal is received from the startup instruction unit 26. When power is supplied to the reception unit 21, the lower signal processing unit 23-1 and the startup instruction unit 26 at a constant interval, the interval of power supply to the reception unit 21, the lower signal processing unit 23-1 and the startup instruction unit 26, and the interval of power supply to the storage unit 24 and the radio communication unit 25 may be equal to or different from each other.

Second Embodiment

Figure 5:
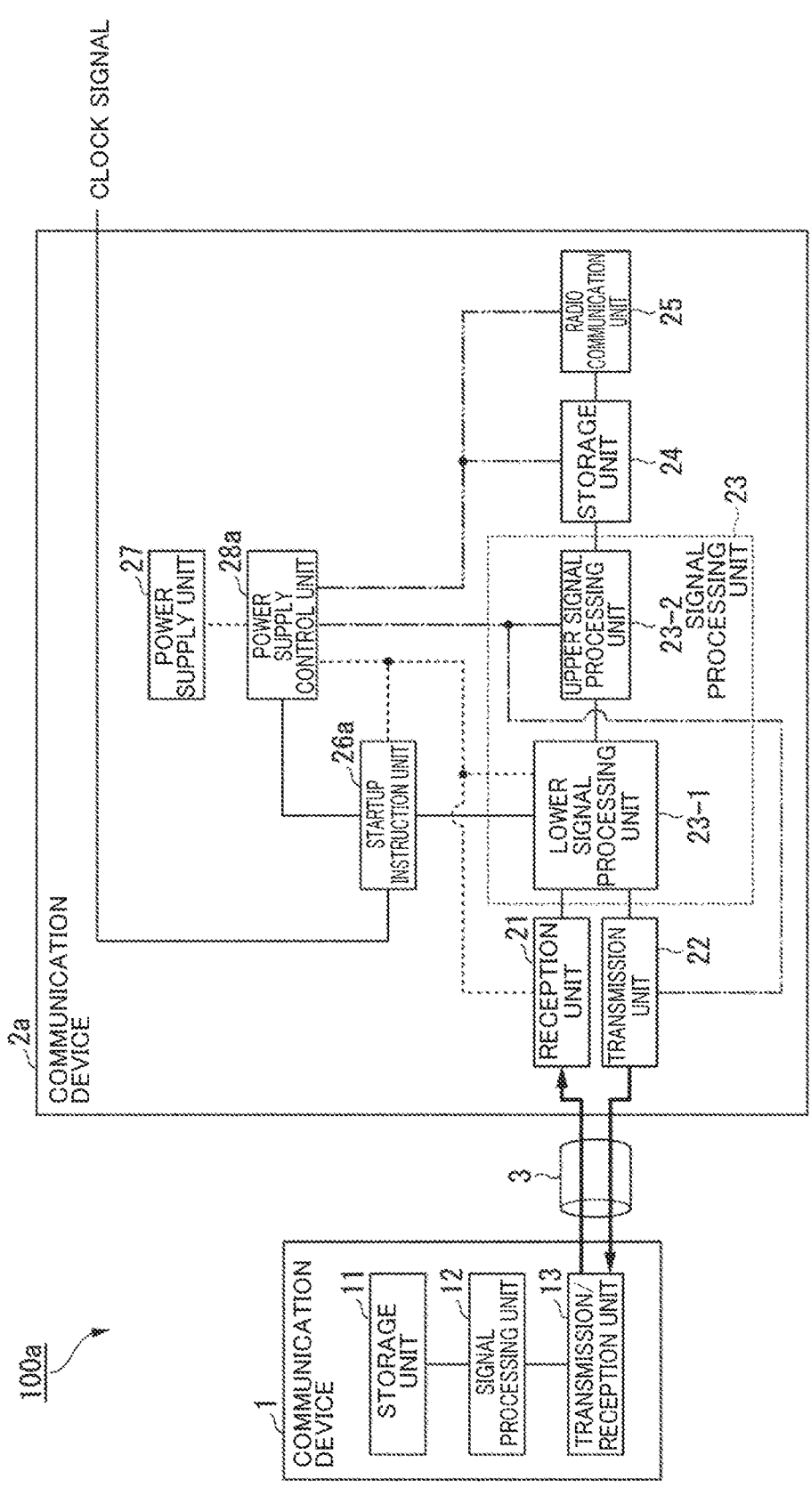
FIG. 5 is a block diagram showing an example of a configuration of a communication system according to a second embodiment.

FIG. 5 is a block diagram showing a configuration of a communication system 100a according to the second embodiment. In the second embodiment, identical configurations to the first embodiment have been allocated identical reference symbols, and only different configurations will be described below.

The communication system 100a includes a communication device 1 and a communication device 2a. The communication device 2a is, for example, an ONU as well as the communication device 2. The communication device 2a includes a reception unit 21, a transmission unit 22, a signal processing unit 23, a storage unit 24, a radio communication unit 25, a startup instruction unit 26a, a power supply unit 27, and a power supply control unit 28a. The startup instruction unit 26a has the following configuration in addition to the configuration provided in the startup instruction unit 26 of the first embodiment. The startup instruction unit 26a generates a constant interval at which the storage unit 24 and the radio communication unit 25 start in accordance with a period of a clock signal supplied from the outside, that is, a power supply control timing information indicating a constant interval for supplying power to the storage unit 24 and the radio communication unit 25.

The power supply control unit 28a has the same configuration as the power supply control unit 28 of the first embodiment, except for the configuration described below. The power supply control unit 28 of the first embodiment always supplies power to the storage unit 24 and the radio communication unit 25 at a predetermined constant interval. On the other hand, the power supply control unit 28 of the second embodiment supplies power to the storage unit 24 and the wireless communication unit 25 at a constant interval indicated by the power supply control timing information generated by the startup instruction unit 26a. (Processing in Startup Instruction Unit and Power Supply Control Unit of Second Embodiment)

FIG. 6 is a flow chart showing the flow of processing by the startup instruction unit 26a and the power supply control unit 28a in the second embodiment. The startup instruction unit 26a takes in a clock signal supplied from the outside (step Sb1). The startup instruction unit 26a calculates a constant interval from the cycle of the taken-in clock signal. The startup instruction unit 26a generates power supply control timing information indicating the calculated fixed interval (step Sb2). The startup instruction unit 26a outputs the generated power supply control timing information to the power supply control unit 28a. When the power supply control unit 28a takes in the power supply control timing information output by the startup instruction unit 26a, the power supply control unit 28a always supplies power to the storage unit 24 and the radio communication section 25 at a constant interval indicated by the taken-in power supply control timing information (step Sb3).

In the communication system 100a of the second embodiment, the communication device 2a as the second communication device is provided with a power supply control unit 28a for supplying power to the storage unit 24 and the radio communication unit 25 according to the timing indicated by the clock signal supplied from the outside. Thus, a constant interval at which the storage unit 24 and the radio communication unit 25 are started can be determined by a clock signal supplied from the outside. Therefore, by changing the period of the clock signal, a constant interval at which the storage unit 24 and the radio communication unit 25 are started can be changed.

In the second embodiment above described, when power is supplied to the storage unit 24 and the radio communication unit 25 at a constant interval indicated by power supply control timing information generated from a clock signal, the power supply control unit 28a of the communication device 2 always supplies power to the storage unit 24 and the radio communication unit 25 at a constant interval indicated by the power supply control timing information. On the other hand, the power supply control unit 28a may switch a state in which power is supplied during the sleep state, to the storage unit 24 and wireless communication unit 25 at a constant interval indicated by power supply control timing information, to a state in which power is continuously supplied to the storage unit 24 and the radio communication unit 25, when a power supply restart instruction signal is received from the startup instruction unit 26a.

Third Embodiment

FIG. 7 is a block diagram showing a configuration of a communication system 100b according to the third embodiment. In the third embodiment, identical configurations to the first embodiment have been allocated identical reference symbols, and only different configurations will be described below.

The communication system 100b includes a communication device 1b and a communication device 2b. The communication device 1b is, for example, an OLT as well as the communication device 1. The communication device 1b includes a storage unit 11, a signal processing unit 12b, and a transmission/reception unit 13. The signal processing unit 12b has the following configuration in addition to the configuration provided in the signal processing unit 12 of the first embodiment. When generating a signal frame for the startup instruction signal, the signal processing unit 12b writes power supply interval information indicating a predetermined interval of power supply in a communication device 2b, for example, in a free area of the signal frame for the startup instruction signal, and generates a signal frame for the startup instruction signal.

The communication device 2b is, for example, an ONU as well as the communication device 2. The communication device 2b includes a reception unit 21, a transmission unit 22, a signal processing unit 23b, a storage unit 24, a radio communication unit 25, a startup instruction unit 26b, a power supply control unit 28b, and a power supply unit 27. The lower signal processing unit 23b includes a lower signal processing unit 23b-1 and an upper signal processing unit 23-2. The lower signal processing unit 23b-1 has the following configuration in addition to the configuration provided in the lower signal processing unit 23 of the first embodiment. When the reception signal received by the reception unit 21 is a startup instruction signal and the startup instruction signal includes the power supply interval information, the lower signal processing unit 23b-1 generates and outputs a startup instruction reception notification signal including the power supply interval information included in the startup instruction signal.

The startup instruction unit 26b has the following configuration in addition to the startup instruction unit 26 of the first embodiment. When power supply interval information is included in the startup instruction reception notification signal received from the lower signal processing unit 23b-1, the startup instruction unit 26b generates power supply control timing information indicating a constant interval for supplying power to the reception unit 21, the lower signal processing unit 23b-1, and the startup instruction unit 26b from the power supply interval information.

The power supply control unit 28b has the same configuration as the power supply control unit 28 of the first embodiment, except for the configuration described below. The power supply control unit 28 of the first embodiment always continuously supplies power to the receiving unit 21, the lower signal processing unit 23-1, and the startup instruction unit 26. On the other hand, the power supply control unit 28b of the third embodiment supplies power at a constant interval indicated by the power supply control timing information generated by the startup instruction unit 26b, to the lower signal processing unit 23b-1 and the startup instruction unit 26b.

(Processing of Communication System According to Third Embodiment)

FIG. 8 is a flow chart showing a flow of processing of the communication system 100b according to the third embodiment. On the assumption that the processing shown in FIG. 8 is performed, it is assumed that the communication device 2b is in a sleep state, and the transmission unit 22 and the upper signal processing unit 23-2 are in a state in which the power supply is stopped. It is assumed that the state flag of the lower signal processing unit 23b-1 is information indicating a sleep state.

The signal processing unit 12b of the communication device 1b generates a signal frame for a startup instruction signal including predetermined power supply interval information at timing of releasing the sleep state of the communication device 2. The signal processing unit 12b generates a startup instruction signal from a signal frame for the startup instruction signal. The signal processing unit 12b outputs the generated startup instruction signal to a transmission/reception unit 13. The transmission/reception unit 13 takes in the electric startup instruction signal outputted by the signal processing unit 12b. The transmission/reception unit 13 converts the taken-in electric startup indication signal into an optical startup instruction signal. The transmission/reception unit 13 transmits the optical startup instruction signal to the optical fiber transmission line 3. The optical fiber transmission line 3 transmits the optical startup instruction signal transmitted by the transmission/reception unit 13 to the communication device 2 (step Sc1).

When the reception unit 21 of the communication device 2b receives the optical signal transmitted by the optical fiber transmission line 3 as a reception signal, the processing of the subroutine of the signal reception processing shown in FIG. 9 is started (step Sc2). In FIG. 9, the processing of steps Sc11, Sc12, Sc13, Sc14, and Sc15 is identical to the processing of steps Sa11, Sa12, Sa13, Sa14, and Sa15 in FIG. 3, and is performed by the reception unit 21, the lower signal processing unit 23b-1, the upper signal processing unit 23-2 and a radio communication unit 25.

In the processing of the step Sc12, when it is determined that the received signal is a startup instruction signal (step Sc12, Yes), the lower signal processing unit 23b-1 performs the processing of the following step Sc16. When the power supply interval information is included in a signal frame detected from the startup instruction signal, the lower signal processing unit 23b-1 reads the power supply interval information, generates a startup instruction reception notification signal including the read power supply interval information, and outputs it to the startup instruction unit 26b. On the other hand, when the power supply interval information is not included in the signal frame detected from the startup instruction signal, the lower signal processing unit 23b-1 generates a startup instruction reception notification signal and outputs it to a startup instruction unit 26b (step Sc16).

The startup instruction unit 26b takes in the startup instruction reception notification signal output by the lower signal processing unit 23b-1. The startup instruction unit 26b determines whether or not the power supply interval information is included in the taken-in startup instruction reception notification signal (step Sc17). When it is determined that the power supply interval information is included in the taken-in startup instruction reception notification signal (step Sc17, Yes), the startup instruction unit 26b generates power supply control timing information from the power supply interval information included in the startup instruction reception notification signal. The startup instruction unit 26b outputs the generated power supply control timing information to a power supply control unit 28b (step Sc18).

When the power supply control unit 28b takes in the power supply control timing information output by the startup instruction unit 26b, the power supply control unit 28b supplies power to the reception unit 21, the lower signal processing unit 23b-1, and the startup instruction unit 26b, and switches the state of continuously supplying power to the state of supplying power at a constant interval indicated by the taken-in power supply control timing information (step Sc19).

When it is determined that the power supply interval information is not included in the taken-in startup instruction reception notification signal (step Sc17, No), the startup instruction unit 26b outputs a power supply restart instruction signal to a power supply control unit 28b after processing of the step Sc19. The power supply control unit 28b restarts power supply to the transmission unit 22 and the upper signal processing unit 23-2 (step Sc20) when taking in a power supply restart instruction signal output by a startup instruction unit 26b, exits the subroutine for receiving signal processing in FIG. 9, and performs step Sc3 in FIG. 8.

The transmission unit 22 and the upper signal processing unit 23-2 are started when receiving power supply from the power supply unit 27 via the power supply control unit 28b. When the upper signal processing unit 23-2 is started, the same processing as the subroutine of the start completion signal transmission processing shown in FIG. 4 of the first embodiment is performed by the upper signal processing unit 23-2, the lower signal processing unit 23b-1 and the transmission unit 22 (step Sc3). Thereafter, the same processing as the processing of the step Sa4 of the first embodiment is performed by a transmission/reception unit 13 and a signal processing unit 12*b* of the communication device 1*b* (step Sc4).

After the processing of the step Sc4, normal data transmission/reception processing is performed between the communication device 1*b* and the communication device 2*b*, and the communication device 2*b* transitions from the activate state to the sleep state again (step Sc5).

As described above, in the processing of step Sc1, the communication device 1*b* transmits the startup instruction signal including the power supply interval information to the communication device 2*b*. Therefore, the signal processing unit 12*b* of the communication device 1*b* can specify an interval at which the reception unit 21, the lower signal processing unit 23*b*-1 and a startup instruction unit 26*b* of the communication device 2*b* start from the power supply interval information transmitted to the communication device 2*b*. Therefore, a signal processing unit 12*b* of the communication device 1*b* generates the next startup instruction signal at the timing when the reception unit 21, the lower signal processing unit 23*b*-1 and the startup instruction unit 26*b* are started, and transmits the generated startup instruction signal to the communication device 2*b* via a transmission/reception unit 13 (step Sc6). Thus, the reception unit 21 of the communication device 2*b* can receive the startup instruction signal transmitted by the communication device 1*b* at the start timing, the processing after step Sc2 is performed again.

In the communication system 100*b* of the third embodiment, the communication device 1*b* as the first communication device transmits the startup instruction signal including power supply interval information indicating an interval of power supply in the communication device 2*b* as the second communication device. The power supply control unit 28*b* provided in the communication device 2*b* supplies power to the reception unit 21, the lower signal processing unit 23*b*-1, and the startup instruction unit 26*b* according to an interval indicated by power supply interval information received from the communication device 1*b*. Thus, in the communication device 2*b*, since the state of power supply to the reception unit 21, the lower signal processing unit 23*b*-1, and the startup instruction unit 26*b* is changed from a state of continuously supplying power to a state of supplying power at a constant interval, the power consumption in the communication device 2*b* can be reduced.

In the third embodiment, although the power supply interval information is predetermined, a control unit of the communication device 1*b* not shown may be operated by the operator of the communication system 100*b* to provide the power supply interval information specified by the operator to the signal processing unit 12*b* via the control unit. Thus, an operator changes the interval indicated by the power supply interval information to change a constant interval at which the reception unit 21, the lower signal processing unit 23*b*-1 and the startup instruction unit 26*b* start.

In the third embodiment, when the power supply control timing information output by the startup instruction unit 26*b* is taken-in, the power supply control unit 28*b* may set the interval of power supply to the storage unit 24 and the radio communication unit 25 of the communication device 2*b* at a constant interval indicated by the power supply control timing information, that is, may switch to a constant interval indicated by the power supply interval information. Further, in this case, in the power supply interval information, the interval of power supply to the reception unit 21, the lower signal processing unit 23*b*-1 and the startup instruction unit 26*b*, and an interval of power supply to the storage unit 24 and the radio communication unit 25 can be defined individually, and the interval of power supply to the reception unit 21, the lower signal processing unit 23*b*-1 and the startup instruction unit 26*b* may be made different from the interval of power supply to the storage unit 24 and the radio communication unit 25.

In the third embodiment, the power supply control unit 28*b* of the communication device 2*b* supplies power to the reception unit 21, the lower signal processing unit 23*b*-1, and the startup instruction unit 26*b* at a constant interval indicated by the power supply control timing information. On the other hand, the power supply control unit 28*b* may make a state of supplying power to the reception unit 21, the lower signal processing unit 23*b*-1, and the startup instruction unit 26*b* at a constant interval indicated by the power supply control timing information during a sleep state, when the power supply restart instruction signal is received from the startup instruction unit 26*b*, may switch the state to a state of continuously supplying power to the reception unit 21, the lower signal processing unit 23*b*-1, and the startup instruction unit 26*b*. Similarly, when a power supply control unit 28*b* of the communication device 2*b* supplies power to the storage unit 24 and the radio communication unit 25 at a constant interval indicated by the power supply control timing information, the power supply control unit 28*b* of the communication device 2*b* makes a state of supplying power to the storage unit 24 and the radio communication unit 25 at a constant interval indicated by the power supply control timing information during a sleep state, when the power supply restart instruction signal is received from the startup instruction unit 26*b*, may switch to a state of continuously supplying power to the storage unit 24 and the radio communication unit 25.

Additionally, the above-described configuration of the third embodiment may be combined with the configuration of the second embodiment. Thus, the interval of power supply to the reception unit 21, the lower signal processing unit 23*b*-1, and the startup instruction unit 26*b* can be set to a constant interval indicated by power supply interval information transmitted by the communication device 1*b*, and the interval of power supply to the storage unit 24 and the radio communication unit 25 can be set to a constant interval according to the period of the clock signal.

In each of the first to third embodiments, the communication devices 2, 2*a*, 2*b* has a power supply unit 27 inside, but the power supply unit 27 may be provided outside, in this case, the power supply unit 27 may be a battery or a device for generating electric power.

In the first to third embodiments described above, although the transmission/reception unit 13 of the communication devices 1 and 1*b* and the reception unit 21 and the transmission unit 22 of the communication devices 2, 2*a* and 2*b* are optical transistors, an optical fiber transmission line may be replaced with a transmission line for transmitting an electric signal, the transmission/reception unit 13 may be a function unit for transmitting and receiving the electric signal, the reception unit 21 may be a function unit for receiving the electric signal, and the transmission unit 22 may be a function unit for transmitting the electric signal.

In the third embodiment, the startup instruction unit 26*b* generates power supply control timing information from the power supply interval information. On the other hand, the format of the power supply interval information and the format of the power supply control timing information are made the same format, and a startup instruction unit 26*b* does not generate the power supply control timing information from the power supply interval information, the power supply interval information may be outputted to the power supply control unit 28b as it is.

The communication devices 1, 1b and the communication devices 2, 2a, in the above-described embodiments may be realized by computers. In this case, it may be realized by recording the program for realizing these functions on a computer-readable recording medium, reading the program recorded in the recording medium into the computer system, and executing the program. Note that the "computer system" mentioned here includes OS and hardware such as peripheral equipment. In addition, the "computer-readable recording medium" includes a portable medium such as a flexible disc, a magneto-optical disc, a ROM, and a CD-ROM, and a storage device such as a hard disk built in the computer system. Furthermore, the "computer-readable recording medium" may also include a recording medium that dynamically holds a program for a short time period such as a communication wire when the program is to be transmitted via a network such as the Internet or a communication line such as a telephone line as well as a recording medium that holds a program for a certain time period such as a volatile memory inside a computer system serving as a server or a client in that case. Moreover, the program described above may be any of a program for realizing some of the functions described above, a program capable of realizing the functions described above in combination with a program already recorded in the computer system, and a program for realizing the functions by using a programmable logic device such as a Field Programmable Gate Array (FPGA).

Although the embodiment of the present invention has been described in detail with reference to the drawings, a specific configuration is not limited to this embodiment, and design within the scope of the gist of the present invention, and the like are included.

INDUSTRIAL APPLICABILITY

The present invention can be used for a communication system having a sleep state.

REFERENCE SIGNS LIST

1 Communication device
2 Communication device
3 Optical fiber transmission line
11 Storage unit
12 Signal processing unit
13 Transmission/reception unit
21 Reception unit
22 Transmission unit
23 Signal processing unit
23-1 Lower signal processing unit
23-2 Upper signal processing unit
24 Storage unit
25 Radio communication unit
26 Startup instruction unit
27 Power supply unit
28 Power supply control unit

The invention claimed is:

1. A communication system comprising:
a first communication device, including one or more processors, configured to transmit a startup instruction signal; and
a second communication device, including one or more processors, configured to restart supply of power that has been stopped in a sleep state when receiving the startup instruction signal from the first communication device, and comprises a signal processing unit that includes transmission data in a start completion signal when generating the start completion signal that is a response signal to the startup instruction signal, wherein:
the second communication device includes a power supply control unit configured to control power supply;
the first communication device is configured to transmit the startup instruction signal including power supply interval information indicating an interval of power supply performed during the sleep state by the power supply control unit;
the second communication device further includes a reception unit configured to receive a signal transmitted by the first communication device;
the signal processing unit of the second communication device includes a lower signal processing unit configured to determine whether or not the signal received by the reception unit is the startup instruction signal;
the power supply control unit supplies power to the reception unit and the lower signal processing unit during the sleep state according to an interval indicated by the power supply interval information; and
the first communication device is configured to transmit the startup instruction signal according to the interval indicated by the power supply interval information.

2. The communication system according to claim 1, wherein:
the second communication device includes a radio communication unit configured to receive data by radio, and a storage unit configured to store the data received by the radio communication unit as the transmission data; and the power supply control unit is configured to supply power to the radio communication unit and the storage unit, during the sleep state according to the interval indicated by the power supply interval information.

3. The communication system according to claim 1, wherein:
the second communication device includes the radio communication unit that receives data by radio, the storage unit that stores the data received by the radio communication unit as the transmission data, and the power supply control unit that controls power supply; and
the power supply control unit is configured to supply power to the radio communication unit and the storage unit, during the sleep state according to an interval indicated by a period of a clock signal supplied from the outside.

4. The communication system according to claim 1, wherein:
the second communication device includes the reception unit that receives a signal transmitted by the first communication device, a transmission unit configured to transmit a signal to the first communication device, and the power supply control unit that controls power supply;
the signal processing unit of the second communication device includes the lower signal processing unit that causes the transmission unit to transmit the start completion signal and to output a startup instruction reception notification signal when the signal received by the reception unit is the startup instruction signal;

and an upper signal processing unit that causes the lower signal processing unit to generate the start completion signal including the transmission data when the supply of power is resumed, and the power supply control unit is configured to supply power to the reception unit and the lower signal processing unit during the sleep state, stops power supply to the transmission unit and the upper signal processing unit during the sleep state, and when the lower signal processing unit outputs the startup instruction reception notification signal, restarts supply of the power that has been stopped in the sleep state to the transmission unit and the upper signal processing unit.

5. A communication device, including one or more processors, configured to restart supply of power that has been stopped in a sleep state upon reception of a startup instruction signal, wherein the communication device includes a signal processing unit that includes transmission data in a start completion signal, when generating the start completion signal that is a response signal to the startup instruction signal;

wherein the communication device further includes a power supply control unit configured to control power supply;

wherein the startup instruction signal includes power supply interval information indicating an interval of power supply performed during the sleep state by the power supply control unit;

wherein the communication device further includes a reception unit configured to receive a signal transmitted by an external communication device;

wherein the signal processing unit includes a lower signal processing unit configured to determine whether or not the signal received by the reception unit is the startup instruction signal;

wherein the power supply control unit is configured to supply power to the reception unit and the lower signal processing unit during the sleep state according to an interval indicated by the power supply interval information; and wherein the external communication device is configured to transmit the startup instruction signal according to the interval indicated by the power supply interval information.

6. A communication method, comprising:

transmitting, by a first communication device, a startup instruction signal; restarting, by a second communication device, supply of power stopped in a sleep state when receiving the startup instruction signal from the first communication device, and including transmission data in the start completion signal, when generating a start completion signal that is a response signal to the startup instruction signal, wherein the startup instruction signal includes power supply interval information indicating an interval of power supply performed during the sleep state by the second communication device;

controlling power supply by the second communication device;

receiving, by the second communication device, a signal transmitted by the first communication device;

determining, by the second communication device, whether or not the signal received by the second communication device is the startup instruction signal;

supplying, by the second communication device, power to a reception unit and a lower signal processing unit during the sleep state according to an interval indicated by the power supply interval information.

* * * * *